Patented Sept. 4, 1951

2,567,016

UNITED STATES PATENT OFFICE 2,567,016

HYDROCARBON RUBBER PLASTICIZED WITH A POLYVINYL COMPOUND

Albert M. Gessler, Cranford, and Andrew F. Sayko, Elizabeth, N. J., assignors to Standard Oil Development Company, a corporation of Delaware No Drawing. Application October 21, 1947, Serial No. 781,256

17 Claims. (Cl. 260—45.5)

The present invention relates to the art of improving and compounding hydrocarbon rubbers and more specifically to compounding and plasticizing natural and synthetic rubbers so that they may be handled more readily to produce better products. The invention will be fully understood from the following description.

In the manufacture of rubber articles by means of processes such as milling, calendering, extrusion, molding and the like, it is the practice to employ a plasticizing agent. These agents may be of various sorts and compositions but in any case they are milled or otherwise mixed into the rubber to the extent of 5 to 50%. The general effect is to increase plasticity and workability of the material, to produce smoother operation, products of better finish, and to increase the speed of the mechanical work. Heretofore it has been the practice to employ as plasticizing agents materials which are soluble or miscible with the hydrocarbon rubber and while the plasticizing value of the different compounds has differed considerably, they are all roughly equivalent in that they accomplish much the same effects in much the same way. Thus these materials are all softeners, decreasing the tensile strength and producing their effect in this manner. It has now been found that excellent results can be obtained by an entirely different class of plasticizing compounds which are actually immiscible with the hydrocarbon rubbers or at least they are miscible only to such a slight degree, if at all, as to justify this term, since it is perfectly clear that two phase mixtures are obtained. These plasticizers are readily distinguished from the known plasticizers described heretofore since they are not essentially softeners, but have a previously unknown effect on the elastic properties of the rubbery polymers to which they are added, in decreasing the nerve of the rubbers to facilitate processing and to decrease swell after extrusion in a manner quite exceptional. They also greatly decrease the elasticity and increase plasticity in quite sharp contradistinction from the other types of known plasticizers. The compounded materials produced are found to consist of a plurality of phases and although this has been found objectionable in the past when using relatively low molecular weight plasticizers, resulting in "bleeding," it is now found that when using a non-miscible type plasticizer of a polymeric nature, greater than about 2,000 in molecular weight, physical loss or bleeding out the plasticizer does not occur.

The rubbery materials with which the present invention deals are hydrocarbons of various types and kinds. Natural rubber is the first example and it may be greatly improved by the application of this invention as well as may be its natural equivalents such as gutta percha and balata. Synthetic hydrocarbon rubbers also are contemplated within the scope of this invention, e. g., those manufactured by the low temperature or by the emulsion technique. Among the low temperature rubbers or rubbery materials are first the unvulcanizable polymers of isoolefins, and more especially polyisobutylene, but the invention probably finds greater use with the vulcanizable copolymers prepared by copolymerization of diolefins, such as butadiene, isoprene, piperylene, or dimethyl butadiene on the one hand with isoolefins, such as isobutylene, on the other. The copolymerization is carried out at low temperature, below about 0° C., using aluminum chloride and its equivalent type catalysts dissolved in alkyl halides or similar solvents. This process is well known and an adequate description will be found in U. S. Patent No. 2,356,128.

Another rubber type is that prepared by emulsion copolymerization of diolefins such as butadiene-1,3 or its equivalent, with vinyl aromatics such as styrene. For a description of this process see the following U. S. Patents 1,938,730 and 1,938,731. Polybutadiene prepared by either emulsion polymerization or by mass polymerization catalyzed by sodium is also included in the class of hydrocarbon rubbers, which may be expired by the present plasticizing technique.

All of these rubbery materials are merely mentioned as examples and it is believed that the present treatment and compounding method are suitable for all elastic hydrocarbon rubbers, whether naturally occurring or synthetic. The plasticizers which have been referred to above belong to the class of polyvinyl compounds containing oxygen and, more specifically, polyvinyl ethers and poly esters, but of these materials it seems probable that the ethers are the most desirable and among them may be mentioned the vinyl methyl ether, vinyl ethyl ether, and the various propyl, butyl, amyl, and hexyl vinyl ethers. The simple polymers of such materials may be employed, but it is also possible to employ copolymers, for example of vinyl normal butyl and vinyl isobutyl ethers or of the other ethers mentioned above. It will be understood that the properties of these polymers vary somewhat, especially the viscosity, mainly with the degree of polymerization and to a lesser degree with the particular vinyl ether employed. Those polymers of moderately high viscosities or even solid materials are the most desirable, especially in the molecular weight range of 8,000–30,000 (Staudinger) and perfectly from 8,000 to 15,000. Among the poly esters may be mentioned polyvinyl acetate, polyvinyl propionate butyrate; methyl, ethyl, butyl and hexyl acrylates; methyl, ethyl, butyl, and octyl methacrylates; diethyl fumarate, and similar fumarates of alcohols of 1 to 8 carbon atoms, and the like. It will be understood that copolymers of these materials may also be employed as well as copolymers of the esters or ethers with vinyl chloride and vinyl alcohol.

If the plasticizer is too low in viscosity, it is difficult to incorporate it in the rubbery material and it may be lost mechanically. It is also likely to bleed to some extent from the finished polymer so that the highly viscous or low softening solid products are preferred.

It has been found that the polyvinyl compounds of the viscosity range given above can be effectively incorporated with rubbers on heated rubber mills, the plasticizer being added gradually as it is incorporated into the mass. As stated before, these systems show a plurality of phases and as the plasticizer is added, the rubbery polymer becomes opaque, shows characteristic streaks and blushing, but as incorporation is more thoroughly obtained, these factors appear to diminish to a certain extent. While the materials are probably not in mutual solution, the dispersion is smooth and may be stated to be homogeneous. The two phases, however, can be determined microscopically.

When the solid polyvinyl compound or one above the viscosity limits given above is employed, it is desirable to dilute it to form a viscous solution and to add this to the rubbery polymer on the mill. The solvents employed should be those which readily dissolve the polyvinyl compounds and among these various esters, such as ethyl, propyl, isopropyl and butyl acetates are very satisfactory, but the phosphates and phthalates can also be used. It is preferred to employ materials of a relatively low boiling point below about 120° C. so that they will be evaporated on the hot mill and will be removed, leaving the ingredients in a homogeneous dispersion.

In the milling of the polymers and the addition of the plasticizers, various other ingredients ordinarily used in compounding can be added, as in the usual practice, for example vulcanizing agents and accelerators, fillers and the like, but it is not necessary to add other rubbery materials as cosolvents. Softeners of the ordinary type may, of course, be added such as oils or petrolatum if desired and vulcanization is accomplished in the same manner although it appears that the vulcanization rate is slightly slower because of dilution effect of the plasticizers.

One particularly interesting feature of this invention should be noted, namely, that excellent compounds can be made without the use of carbon black or other adsorbent carbons, and strange as it may seem, the plasticizers employed produce a strengthening effect somewhat similar to that of the carbon black itself. Thus this property can be exploited in making white or variously colored stocks in the absence of carbon black, employing the present plasticizers with white or colored fillers.

In making the present compounds ordinarily from 5 to 25% of the plasticizer may be advantageously employed and in specific cases, for special purposes, it may be as high as 50%.

*Example I*

In this example the polymer rubber in question is an emulsion polymer made by copolymerizing butadiene with styrene in an aqueous emulsion, using persulfate as a catalyst. This polymer is readily dissolved in dibutyl phthalate which is taken as a well recognized example of a liquid, soluble plasticizer. As the immiscible plasticizer polyvinyl n-butyl ether, molecular weight of 8,490 (Staudinger), was selected, having a viscosity of 5,400 cs. at 210° F.

The incorporation of the dibutyl phthalate on the mill is difficult and care had to be taken, the material added very slowly to prevent the stock from breaking apart and to prevent loss of the plasticizer, but it is finally added with a mill operating at 1:1.4 speed ratio and samples are prepared containing 5, 10, 15, 20 and 25% soluble plasticizer.

The polyvinyl butyl ether does not dissolve the rubber but the materials are admixed readily on the mill. At first the rubber becomes opaque and showed characteristic streaks due to the presence of two phases. Samples containing 5, 10, 15 and 20% by weight of the plasticizer are prepared. The incorporation is readily accomplished without any difficulty and without loss. There is no lacing tendency.

After samples are prepared, milling is continued so that each sample had had the same overall mechanical treatment.

It is desired to show the relative elasticity of the systems shown above. For this purpose the several materials are extruded according to a set pattern using the same die, temperature and pressure, to form tubes. From the die and pin which are used, the theoretical dimensions of the tube are:

| | Inch |
|---|---|
| Outside diameter | 0.4 |
| Inside diameter | 0.3 |
| Wall thickness | 0.05 |

The tubes collected in duplicate from each stock are taken immediately to an air circulating oven maintained at the same temperature as the extruder (220° F.) and allowed to rest for ten minutes. This heating period is employed to attain for the tube complete lateral swell and longitudinal shrinkage, i. e. complete development of the reversible high elastic component of the deformation given the rubber as it passes through the extruder die. The tubes, cooled for five minutes after removal from the oven, are measured for weight and length. From these measurements and from the specific gravity of the stock, the volume of the tube in cubic centimeters per inch was calculated. A material would, if it were completely plastic, extrude exactly to die dimensions and would have then a volume per inch of 0.9 cc./inch. This value therefore is the theoretical value; elastic tendencies of polymer systems would result in tube volumes which would be larger than the theoretical value, the tendency being proportional to the increase.

The following table shows the measurements taken:

| Per Cent Plasticizer | Volume Extruded, cc./inch | Rate of Extrusion, inches/minute |
|---|---|---|
| None | 2.87 | 34.5 |
| 5% Dibutyl Phthalate | 2.90 | 38.5 |
| 10% | 2.96 | 39.0 |
| 15% | 3.00 | 38.5 |
| 20% | 3.20 | 39.4 |
| 25% | 3.30 | 39.9 |
| 5% Polyvinyl butyl ether | 2.22 | 50.5 |
| 10% | 2.00 | 59.3 |
| 15% | 1.75 | 68.2 |
| 20% | 1.60 | 82.8 |

Taking first the blends containing the solvent plasticizer, dibutyl phthalate, it is noted that the distortion of the formed tube has become greater as the concentration of the plasticizer was increased. What this means, of course, is that the raw polymer, already highly elastic, has become more elastic with the addition of the solvent plasticizer. In the case of the immiscible dipolymer systems, prepared with the rubbery material and polyvinyl n-butyl ether, the post swell or elasticity of the extruded tube has fallen off rapidly as the concentration of the polyvinyl n-butyl ether was increased. It has approached the range of excellent extrusion performance, which performance can be obtained only with systems characterized by high plasticity and low elasticity.

For a given polymer or polymer system the swell of the formed tube will be increased as the rate of extrusion is increased. This is just another way of saying that the elastic plastic tendencies of polymer systems, as they are measured by deformation studies, are dependent on the rate of stress application. From this it might be expected that for the rubber-polyvinyl n-butyl ether systems shown above slower rates of extrusion would be obtained that was obtained for the Buna-S-dibutyl phthalate system. That this is not the case is shown in the last column of the above table.

As can be seen, the rate of extrusion remains constant over the range of dibutyl phthalate concentrations studied. With polyvinyl n-butyl ether, on the other hand, the rate of extrusion increased sharply as the concentration of the polyvinyl n-butyl ether was increased. These respective behaviors have been found to be typical for "miscible" and "immiscible" plasticizers and are applicable to all polymer and copolymer systems.

*Example II*

As a second example of the use of the nonsolvent plasticizer, the rubber selected was a GR-I prepared by low temperature copolymerization of isobutylene with isoprene. As in the prior example, direct comparison is made between the products obtained with the soluble plasticizer, in this case a lubricating oil of 4.2 cs. viscosity at 210° F. (42 sec. Saybolt), and an immiscible plasticizer polyvinyl isobutyl ether having a viscosity of 5404 cs. @ 210° F.

Just as before the mixtures were made up on the mill containing 5, 10, 15 and 20% by weight of the two plasticizers. Difficulty was met with the hydrocarbon oil and when large quantities (15 to 20%) were used, the stock became soft and tended to stick badly. No difficulty developed with the vinyl isobutyl ether which was incorporated rapidly.

After the plasticizer had been incorporated with the polymer, milling was continued in each case where necessary for varying intervals so that each system was given the same overall mechanical treatment.

In the extrusion test the rubber was extruded under very carefully controlled conditions to form a tube, just as in the prior example. From the die and the pin which were used, the theoretical dimensions of the tube were:

|  | Inch |
|---|---|
| Outside diameter | 0.4 |
| Inside diameter | 0.3 |
| Wall thickness | 0.05 |

The tubes collected in duplicate from each stock were taken immediately to an air circulating oven maintained at the same temperature as the extruder (220° F.) and allowed to rest for ten minutes on a liberally talced base. This heating was employed to attain for the tube complete lateral swell and longitudinal shrinkage, i. e., complete development of the reversible high elastic component of the deformation given the rubber system as it passed through the extruder die. The tubes, cooled for five minutes after removal from the oven, were measured for length and weight. From these measurements and from the specific gravity of the stock the volume of the tube in cubic centimeters per inch was calculated. A material if it were completely plastic would extrude to exact die dimensions and would have, then, a volume per inch of 0.9 cc. This value, therefore, would be the theoretical value; elastic tendencies of polymer systems would result in tube volume which would be larger than the theoretical value, the tendency being proportional to the increase.

The resulting data is recorded in the following table:

| Per Cent Plasticizer | Volume in cc. per Inch of Extruded Material | Extrusion Rate, inches/minute |
|---|---|---|
| None | 3.3-3.12 | 32.3 |
| 5% Hydrocarbon Oil | 3.23 | 33.0 |
| 10% | 3.3 | 31.2 |
| 15% | 3.3 | 31.7 |
| 20% | 3.27 | 33.0 |
| 5% Polyvinyl isobutyl ether | 2.73 | 31.9 |
| 10% | 2.55 | 32.3 |
| 15% | 2.35 | 37.5 |
| 20% | 1.90 | 49.8 |
| 25% | 1.63 | 57.5 |

The samples compounded above with the polyvinyl butyl ether and cured at different times at 307° F. Tests were made on the cured polymers to get modulus and tensile strength data included in the following table:

|  | 6 | 1 | 2 | 3 | 4 | 5 |
|---|---|---|---|---|---|---|
| GR-I_____parts__ | 100.0 | 100.0 | 100.0 | 100.0 | 100.0 | 100.0 |
| Polyvinyl Isobutylether_____do____ | _____ | 5.0 | 10.0 | 15.0 | 20.0 | 25.0 |
| Zinc Oxide_____do____ | 5.0 | 5.0 | 5.0 | 5.0 | 5.0 | 5.0 |
| E. P. C. Black_____do____ | 20.0 | 20.0 | 20.0 | 20.0 | 20.0 | 20.0 |
| S. R. F. Black_____do____ | 30.0 | 30.0 | 30.0 | 30.0 | 30.0 | 30.0 |
| Sulfur_____do____ | 2.0 | 2.0 | 2.0 | 2.0 | 2.0 | 2.0 |
| Tetramethyl thiuram disulfide___do____ | 1.0 | 1.0 | 1.0 | 1.0 | 1.0 | 1.0 |
| Mercapto Benzothiazole_____do____ | 0.5 | 0.5 | 0.5 | 0.5 | 0.5 | 0.5 |
| Cured 8' at 307° F.: | | | | | | |
|   Tensile | 2,740 | 2,570 | 2,450 | 2,055 | 2,055 | 1,895 |
|   Modulus@300% | 235 | 225 | 155 | 130 | 110 | _____ |
|   Modulus@400% | 395 | 330 | 225 | 185 | 155 | _____ |
|   Modulus@500% | 635 | 475 | 325 | 255 | 200 | 135 |
|   Elongation | 955 | 1,045 | 1,045 | 1,145 | 1,165 | 1,280 |
| Cured 12' at 307° F.: | | | | | | |
|   Tensile | 2,770 | 2,525 | 2,525 | 2,340 | 2,305 | 2,130 |
|   Modulus@300% | 325 | 295 | 250 | 200 | 135 | _____ |
|   Modulus@400% | 550 | 470 | 375 | 265 | 205 | 155 |
|   Modulus@500% | 935 | 700 | 515 | 400 | 285 | 245 |
|   Elongation | 885 | 875 | 980 | 1,025 | 1,045 | 1,005 |
| Cured 20' at 307° F.: | | | | | | |
|   Tensile | 2,836 | 2,400 | 2,550 | 2,545 | 2,385 | 2,230 |
|   Modulus@300% | 480 | 425 | 315 | 270 | 195 | _____ |
|   Modulus@400% | 840 | 650 | 460 | 385 | 265 | 210 |
|   Modulus@500% | 1,305 | 1,025 | 680 | 590 | 410 | 310 |
|   Elongation | 805 | 795 | 865 | 900 | 945 | 980 |
| Cured 30' at 307° F.: | | | | | | |
|   Tensile | 2,615 | 2,530 | 2,535 | 2,425 | 2,430 | 2,285 |
|   Modulus@300% | 540 | 565 | 405 | 305 | 260 | _____ |
|   Modulus@400% | 875 | 835 | 600 | 455 | 360 | 295 |
|   Modulus@500% | 1,290 | 1,275 | 850 | 705 | 505 | 430 |
|   Elongation | 780 | 740 | 855 | 860 | 915 | 920 |
| Cured 45' at 307° F.: | | | | | | |
|   Tensile | 2,560 | 2,435 | 2,400 | 2,425 | 2,235 | 2,090 |
|   Modulus@300% | 710 | 640 | 515 | 405 | 250 | 285 |
|   Modulus@400% | 1,130 | 975 | 755 | 605 | 395 | 390 |
|   Modulus@500% | 1,765 | 1,450 | 1,135 | 865 | 600 | 590 |
|   Elongation | 665 | 715 | 740 | 770 | 825 | 800 |

The decrease in cure rate with increase in plasticizer content is most probably one of dilution. The retardation is evidenced by the decrease in modulus and the increase in elongation. The ultimate tensile strength remains high. When a higher modulus, i. e. a high state of cure, is demanded as for cold weather tube performance, it will be desirable to bring up the modulus of the polyether compounds. This may be easily accomplished by using a more unsaturated polymer or curing at a higher temperature.

Taking first the blends containing the "solvent" plasticizer, it can be seen that the distortion of the formed tube becomes greater as the concentration of the plasticizer is increased. What this means, of course, is that the raw polymer, already highly elastic, becomes apparently more elastic as the "solvent" plasticizer is added. This added apparent elasticity, of course, is brought about from the fact that the polymer system, being plasticized to a relatively low viscosity, is not capable of absorbing as much work as the control. In the case of the "non-solvent" plasticizer-polymer systems prepared from GR—I and polyvinyl isobutyl ether, the post swell or elasticity of the extruded tube falls off rapidly as the concentration of the polyether is increased. It approaches very soon the range of excellent extrusion performance, which performance can be obtained only in gum systems which are characterized by high plasticity and low elasticity.

As can be seen from the table, the rate of extrusion remains constant over the whole range of hydrocarbon plasticizer concentrations and is at no time significantly greater than that of the control (no plasticizer). With low molecular weight polyvinyl isobutyl ether, however, the rate of extrusion of the systems increases rather sharply after ten per cent (based on the GR–I) of the former has been added to the matrix polymer. This greatly increased rate of tube formation is all the more desirable and striking when it is remembered that it is accompanied also by apparently very significant decreases in elasticity, i. e., by an approach to a more nearly theoretical tube volume.

*Example III*

Although natural rubber processes generally with greater ease than do the synthetics, the low molecular weight oxygen containing polymeric materials of this invention are valuable as processing aids for natural rubber. They are particularly effective when no or small amounts of fillers are used. Polyethyl acrylate, having a Staudinger No. of 8,000 was added to smoked sheets in proportions from zero to 25 as shown in the table below.

| Smoked Sheet | 100 | 100 | 100 | 100 | 100 | 100 |
|---|---|---|---|---|---|---|
| Polyethyl Acrylate | _____ | 5 | 10 | 15 | 20 | 25 |
| Stearic Acid | .5 | .5 | .5 | .5 | .5 | .5 |
| Zinc Oxide | 6 | 6 | 6 | 6 | 6 | 6 |
| 2-Mercaptobenzothiazole | .5 | .5 | .5 | .5 | .5 | .5 |
| Sulfur | 3.5 | 3.5 | 3.5 | 3.5 | 3.5 | 3.5 |
| Tensile—Elong.—Mod. @ 300%—Shore: | | | | | | |
| Cured 30' @ 287° F.: | | | | | | |
|   Tensile (lbs./sq. in.) | 2,590 | 2,700 | 2,600 | 3,100 | 2,730 | 2,590 |
|   Per Cent Elongation | 830 | 810 | 830 | 850 | 840 | 820 |
|   Modulus at 300% Elongation | 180 | 170 | 240 | 140 | 140 | 140 |
|   Shore Hardness | 26 | 25 | 25 | 24 | 24 | 24 |
| Cured 45' @ 287° F.: | | | | | | |
|   Tensile (lbs./sq. in.) | 2,470 | 2,830 | 2,710 | 2,680 | 2,490 | 2,310 |
|   Per Cent Elongation | 790 | 830 | 840 | 810 | 840 | 740 |
|   Modulus at 300% Elongation | 2,010 | 160 | 180 | 140 | 180 | 130 |
|   Shore Hardness | 27 | 25 | 25 | 25 | 25 | 25 |

A pure gum recipe was employed. The compounds containing 15 and 20 parts of the polyethyl acrylate processes particularly well on the mill and extruded smoothly and rapidly. As may be seen from the evaluation data, up to 20 parts of the polyacrylate do not cause loss of physical properties of the vulcanizates.

*Example IV*

Polybutadiene prepared by emulsion polymerization has received little commercial interest because of its poor processing properties and poor properties of its vulcanizates. Polybutadiene prepared by the emulsion polymerization of butadiene and having a Mooney viscosity of 60 was compounded with varying amounts of polymethyl acrylate as shown in the table given below. The polymethyl acrylate had a Staudinger No. of 10,000. The compound containing no polymethyl acrylate was so non-plastic that it could not be extruded in a laboratory extruder. Those containing 15, 20 and 25 parts of the polyacrylate extruded satisfactorily. In case of the vulcanizates, most unexpectedly, those containing the plasticizer have superior tensile, modulus, and elongation characteristics as compared to that containing no polymethyl acrylate. Instead of getting tensile strengths the order of 1,300 lbs. or less which is usually associated with polybutadiene, by using non-miscible type plastizers of our invention we get tensiles the order of 2,000 lbs. When using low molecular weight plasticizers of the miscible type, tensiles are lower than the 1,300 lb. value. The data on these samples is contained in the following table:

| Polybutadiene | 100 | 100 | 100 | 100 | 100 | 100 |
|---|---|---|---|---|---|---|
| Polymethyl acrylate | | 5 | 10 | 15 | 20 | 25 |
| Zinc Oxide | 5 | 5 | 5 | 5 | 5 | 5 |
| Stearic Acid | 1 | 1 | 1 | 1 | 1 | 1 |
| Thermax | 50 | 50 | 50 | 50 | 50 | 50 |
| Santocure | 1.25 | 1.25 | 1.25 | 1.25 | 1.25 | 1.25 |
| Sulfur | 2 | 2 | 2 | 2 | 2 | 2 |
| Tensile-Elongation Mod.@100%-Mod.@200% | | | | | | |
| 10'@287° F | 1330—200 / 690 | 1420— 210 / 680—1390 | 1990— 240 / 840—1920 | 2090— 320 / 580—1170 | 1850— 330 / 590—1120 | 1870— 290 / 720—1260 |
| 20'@287° F | 1310—190 / 700 | 1220— 180 / 640 | 1600— 210 / 850—1510 | 1730— 250 / 590—1170 | 1820— 290 / 640—1130 | 1470— 220 / 720—1380 |
| 40'@287° F | 1290—180 / 670 | 1270— 190 / 650 | 1830— 210 / 950—1660 | 1920— 270 / 590—1400 | 1760— 260 / 610—1230 | 1680— 230 / 760—1470 |

The above disclosure and the specific examples illustrate the art of the present invention. Its advantage is best manifest by the much improved handling of the hydrocarbon rubbers. In the first place the mechanical forming processes are greatly improved, for example, in molding, extruding, calendering, the material produced conforms much more closely to the desired shape. In the second place such operations may be performed much more rapidly than in the usual art, and the product is given an improved condition— freed from variables, folds, voids and other imperfections. In addition to this, the article is given a certain internal strength greatly lacking particularly in tubes and extruded goods made from synthetic rubber. This latter property is also illustrated even where carbon black or other fillers are not used.

The invention contemplates not only the new compounds but the mechanical forming processes themselves when carried out in the presence of this new class of plasticizing agents. The invention is to be limited only by the prior art and the following claims.

We claim:

1. Process according to claim 16 in which the material is formed by calendering.
2. Process according to claim 16 in which the material is formed by extrusion.
3. Process according to claim 16 in which the material is formed by molding.
4. A vulcanized composition of matter comprising a mixture of a polymeric plasticizer compound having a molecular weight between 8,000 and 30,000, and selected from the group consisting of polyvinyl ethers and saturated polyesters, and a rubbery copolymer of an isoolefin and a conjugated diolefin, said materials being admixed in proportion of 5 to 25% of the plasticizer compound in the unvulcanized hydrocarbon copolymer.
5. A composition according to claim 4 in which the polymeric compound is a polyvinyl ether.
6. A composition according to claim 4 in which the polymeric compound is a saturated polyester.
7. A vulcanized composition of matter comprising a mixture of a polymeric plasticizer compound having a molecular weight between 8,000 and 30,000 and selected from the group consisting of polyvinyl ethers and saturated polyesters and a copolymer of isobutylene and butadiene, said plasticizer compound being admixed in proportion of 5 to 25% of the hydrocarbon copolymer.
8. A vulcanized composition of matter comprising a mixture of a polymeric plasticizer compound having a molecular weight between 8,000 and 30,000 and selected from the group consisting of polyvinyl ethers and saturated polyesters, and a copolymer of isobutylene and butadiene, said plasticizer compound being admixed in proportion of 5 to 25% of the hydrocarbon copolymer.
9. A vulcanized composition of matter comprising a mixture of a polyvinyl ether having a molecular weight between 8,000 and 30,000, and a copolymer of isobutylene and butadiene, said polyether being admixed in proportion of 5 to 25% of the hydrocarbon copolymer.
10. A vulcanized composition of matter comprising a mixture of a polyvinyl ether having a molecular weight between 8,000 and 30,000, and a copolymer of isobutylene and isoprene, said polyether being admixed in proportion of 5 to 25% of the hydrocarbon copolymer.
11. A vulcanized composition of matter comprising a mixture of polyester having a molecular weight between 8,000 and 30,000, and a copolymer of isobutylene and butadiene, said polyester being admixed in proportion of 5 to 25% of a hydrocarbon copolymer.
12. A vulcanized composition of matter comprising a mixture of polyester having a molecular weight between 8,000 and 30,000, and a copolymer of isobutylene and isoprene, said polyester being admixed in proportion of 5 to 25% of a hydrocarbon copolymer.

13. A vulcanized composition of matter comprising polyvinyl isobutyl ether having a molecular weight between 8,000 and 30,000 and a copolymer of an isoolefin and a conjugated diolefin, said polyether being admixed in proportion of 5 to 25% of the hydrocarbon copolymer.

14. A vulcanized composition of matter comprising a mixture of polyvinyl isobutyl ether having a molecular weight between 8,000 and 30,000, and a copolymer of isobutylene and butadiene, said polyether being admixed in proportion of 5 to 25% of the hydrocarbon copolymer.

15. A vulcanized composition of matter comprising polyethyl acrylate having a molecular weight between 8,000 and 30,000 and a copolymer of isobutylene and butadiene, said polyethyl acrylate being admixed in proportion of 5 to 25% of the hydrocarbon copolymer.

16. An improved method for handling and forming copolymers of an isoolefin and a conjugated diolefin which comprises thoroughly dispersing therein from 10 to 50% of a polymeric compound having a molecular weight between 8,000 and 30,000, and selected from the group consisting of polyvinyl ethers and saturated polyesters, then forming the material between shaping surfaces and subsequently vulcanizing.

17. The process according to claim 16 in which the copolymer is mixed with 10 to 50% of a polyvinyl ether having a molecular weight between 8,000 and 30,000, is then brought to shape between forming surfaces and subsequently vulcanizing.

ALBERT M. GESSLER.
ANDREW F. SAYKO.

REFERENCES CITED

The following references are of record in the file of this patent:

UNITED STATES PATENTS

| Number | Name | Date |
| --- | --- | --- |
| 1,989,246 | Reed | Jan. 29, 1935 |
| 2,104,000 | Reppe et al. | Dec. 28, 1937 |
| 2,143,721 | Sweet | Jan. 10, 1939 |
| 2,160,996 | Wiezevich | June 6, 1939 |
| 2,161,934 | Reichard et al. | June 13, 1939 |

FOREIGN PATENTS

| Number | Country | Date |
| --- | --- | --- |
| 112,875 | Australia | Apr. 24, 1941 |
| 705,104 | Germany | Apr. 17, 1941 |

OTHER REFERENCES

Ind. and Eng. Chem., vol. 34, No. 11, page 1304, November 1942.